US011997183B2

(12) United States Patent
Ram et al.

(10) Patent No.: US 11,997,183 B2
(45) Date of Patent: May 28, 2024

(54) HARDWARE CLAMPING OF THE TRANSMISSION CONTROL PROTOCOL (TCP) MAXIMUM SEGMENT SIZE (MSS) PARAMETER IN A SCALABLE AND PROGRAMMABLE NETWORK DEVICE

(71) Applicant: Arista Networks, Inc., Santa Clara, CA (US)

(72) Inventors: Kaushik Kumar Ram, San Jose, CA (US); Syed Rahi, Bangalore (IN); Vishal Bandekar, Bangalore (IN)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 17/704,426

(22) Filed: Mar. 25, 2022

(65) Prior Publication Data

US 2023/0308528 A1 Sep. 28, 2023

(51) Int. Cl.
| | |
|---|---|
| *H04L 69/163* | (2022.01) |
| *H04L 1/00* | (2006.01) |
| *H04L 47/36* | (2022.01) |
| *H04L 67/141* | (2022.01) |
| *H04L 69/22* | (2022.01) |

(52) U.S. Cl.
CPC .......... *H04L 69/163* (2013.01); *H04L 1/0045* (2013.01); *H04L 47/36* (2013.01); *H04L 67/141* (2013.01); *H04L 69/22* (2013.01)

(58) Field of Classification Search
None
See application file for complete search history.

(56) References Cited

U.S. PATENT DOCUMENTS

| | | | | |
|---|---|---|---|---|
| 6,564,267 B1* | 5/2003 | Lindsay | .................... | H04L 9/40 370/465 |
| 6,973,097 B1* | 12/2005 | Donzis | .................. | H04W 80/04 370/470 |
| 11,134,032 B1* | 9/2021 | Bas | .......................... | H04L 49/40 |
| 2008/0008183 A1* | 1/2008 | Takagaki | ............ | H04L 45/3065 370/392 |
| 2008/0043750 A1* | 2/2008 | Keels | ....................... | H04L 69/12 370/395.52 |
| 2008/0101382 A1* | 5/2008 | Bannerjee | ............... | H04L 47/10 370/395.52 |
| 2009/0135840 A1* | 5/2009 | Murray | .................... | H04L 47/36 370/401 |
| 2012/0250703 A1* | 10/2012 | Suzuki | .................. | H04L 69/164 370/474 |

(Continued)

*Primary Examiner* — Duc T Duong
(74) *Attorney, Agent, or Firm* — Fountainhead Law Group, P.C.

(57) ABSTRACT

A network device includes multiple interconnected network chips where the packet processing functionality is distributed between ingress and egress pipelines. TCP MSS clamping can be implemented in the egress pipeline. Processing in the egress pipeline can identify the presence of a TCP MSS value in the packet. The egress pipeline can compare the packet TCP MSS value with a user configured TCP MSS value. The egress pipeline can replace the packet TCP MSS value with the user configured TCP MSS value if the former is greater than the latter, and recompute a checksum. The packet with the replaced TCP MSS value and replaced checksum is then forwarded from the switch toward its eventual destination.

20 Claims, 6 Drawing Sheets

(56) References Cited

U.S. PATENT DOCUMENTS

| | | | |
|---|---|---|---|
| 2012/0281559 A1* | 11/2012 | Ner | H04W 28/06 370/252 |
| 2015/0003449 A1* | 1/2015 | Cui | H04L 49/9057 370/389 |
| 2015/0365503 A1* | 12/2015 | Sung | H04L 69/16 370/252 |
| 2016/0380902 A1* | 12/2016 | Sreeramoju | H04L 69/16 370/401 |
| 2020/0412692 A1* | 12/2020 | Ossipov | H04L 63/1425 |
| 2021/0281442 A1* | 9/2021 | Ray | H04L 12/4641 |
| 2023/0038749 A1* | 2/2023 | Bahadur | H04L 45/7453 |

* cited by examiner

HARDWARE CLAMPING OF THE TRANSMISSION CONTROL PROTOCOL (TCP) MAXIMUM SEGMENT SIZE (MSS) PARAMETER IN A SCALABLE AND PROGRAMMABLE NETWORK DEVICE

BACKGROUND

The Transmission Control Protocol (TCP) is a communications standard that enables application programs and computing devices to exchange messages over a network. It is designed to send packets across the internet and ensure the successful delivery of data and messages over networks. TCP works by opening a connection between two devices that are communicating with each other using a sequence called the "TCP 3-way handshake."

A parameter called the maximum segment size (MSS) is used to limit the size of the data packets (more specifically, the size of the payload in those packets) that are sent between the devices. The TCP MSS value is negotiated between the two devices that set up a TCP session, and in particular during the 3-way handshake to establish the session. Setting the TCP MSS value is also referred to as "TCP MSS clamping," which refers to limiting the maximum value of the TCP MSS parameter.

In some situations, a network device (e.g., router) between the devices may need to reduce the TCP MSS value, for example, to accommodate tunneling headers required for tunneling. The network device can update the TCP MSS value by intercepting and updating the TCP MSS value in the SYN or SYN-ACK packet of the 3-way handshake.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

A network device in accordance with the present disclosure provides TCP MSS clamping by intercepting and updating SYN and SYN/ACK packets in the data plane, rather than via the control plane. In some embodiments, the packet parser in the egress pipeline can intercept the packet and pass the packet to hardware referred to as a TCP clamp. The TCP clamp is configured to compare the TCP MSS value contained in the intercepted packet against a user-configured value. If the TCP MSS value is greater than the user-configured value, then the TCP clamp can generate a new TCP header to replace the original TCP MSS value with the user-configured TCP MSS value, thus clamping the TCP MSS value to the user-configured value. The original TCP header is replaced with the new TCP header. The TCP clamp can generate a new checksum to account for the modified TCP MSS value. The packet can then be passed further downstream in the egress pipeline. The TCP clamp can be a programmable element in the egress pipeline hardware.

The conventional approach of setting the TCP MSS value in the control plane is strictly a software activity. Invoking the control plane while setting up a TCP session introduces latency that can impact session setup and packet throughput. The present disclosure moves this activity to the data plane as part of packet processing, allowing the TCP MSS to be adjusted in hardware thus reducing latency in session setup and improving packet throughput.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
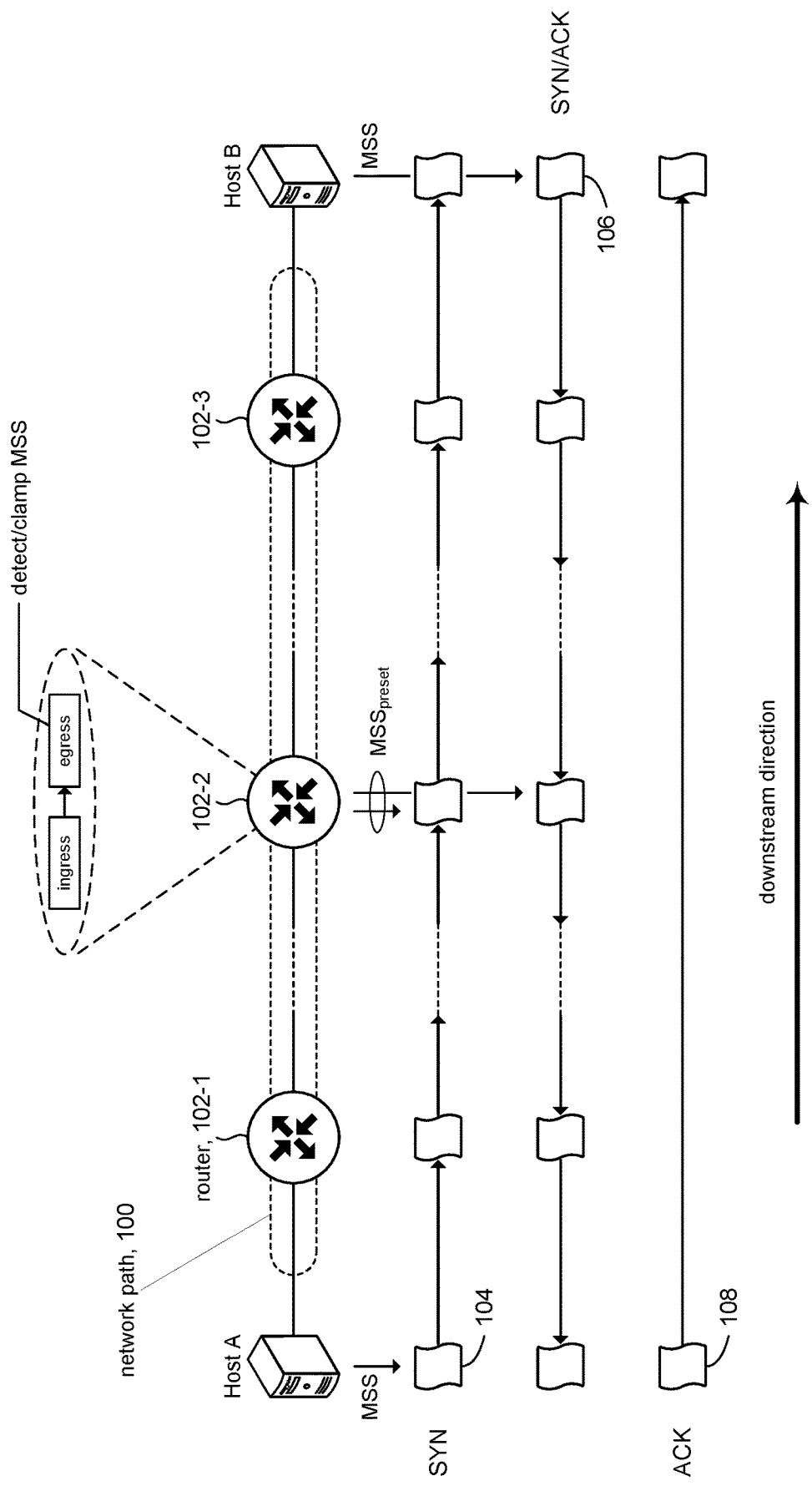
FIG. 1 is a high level representation of a network path comprising one or more network devices in accordance with the present disclosure.

FIG. 1 shows an illustrative network path 100 in a deployed network (not shown) to provide communication between host machines Host A and Host B. The network path comprises routers 102, where Host A is in data communication with endpoint router 102-1 and Host B is in data communication with endpoint router 102-3. To avoid clutter, the figure shows one intermediate router 102-2, although it will be understood that in any given network path between Host A and Host B, there can be any number of intermediate routers.

FIG. 1 shows Host A establishing a Transmission Control Protocol (TCP) session with Host B via a sequence referred to as the TCP 3-way handshake. The handshake involves the exchange of three packets: a SYN packet, a SYN/ACK packet, and an ACK packet. FIG. 1 shows Host A initiating the session by sending a SYN packet 104. The SYN packet is sent from Host A into router 102-1 and transmitted downstream through successive routers along network path 100 to Host B. Merely, for discussion purposes, the present disclosure can adopt the convention where the downstream direction is the direction from Host A to Host B. Host B transmits a SYN/ACK 106 packet into router 102-3 that is then transmitted upstream in the reverse direction through successive routers along network path 100 to Host A. The handshake is completed when Host A transmits ACK packet 108 to Host B.

SYN packet 104 and SYN/ACK packet 106 include a TCP maximum segment size (MSS) value that represents the maximum size of a TCP segment that can be transmitted between the two hosts on each side of a TCP connection. The MSS value is present in the TCP option header. Accordingly, Host A uses the TCP MSS value in SYN packet 104 to inform Host B the maximum amount of data that Host A can receive in a TCP segment. Likewise, Host B uses the TCP MSS value in SYN/ACK packet 106 to inform Host A the maximum amount of data that Host B can receive in a TCP segment.

In some embodiments, routers 102 along network path 100 can be configured in accordance with the present disclosure to clamp the TCP MSS parameter to a preset or otherwise predetermined value to set the maximum segment size used by a TCP session. In the most general case, each router can be configured to clamp the TCP MSS parameter. However, it will be appreciated that in any given network not all routers are necessarily configured for TCP MSS clamping. The discussion will consider router 102-2 as an example.

Router 102-2 can detect SYN packets and SYN/ACK packets and clamp the TCP MSS value contained in those packets to a preset value $MSS_{preset}$. As depicted in FIG. 1, for example, when router 102-2 receives a SYN packet from an upstream device, the TCP MSS value in the SYN packet can be "clamped" to $MSS_{preset}$; in other words, if the TCP MSS value in the received SYN packet exceeds $MSS_{preset}$, then the TCP MSS value is changed to $MSS_{preset}$, otherwise the TCP MSS value remains unchanged. Likewise, for the SYN/ACK packet.

Router 102-2 can process packets in pipeline fashion. FIG. 1 shows that in some embodiments, the pipeline can comprise an ingress pipeline and an egress pipeline. In accordance with the present disclosure, the TCP MSS value can be processed in the egress pipeline. This aspect of the present disclosure is discussed in more detail below.

Figure 2:
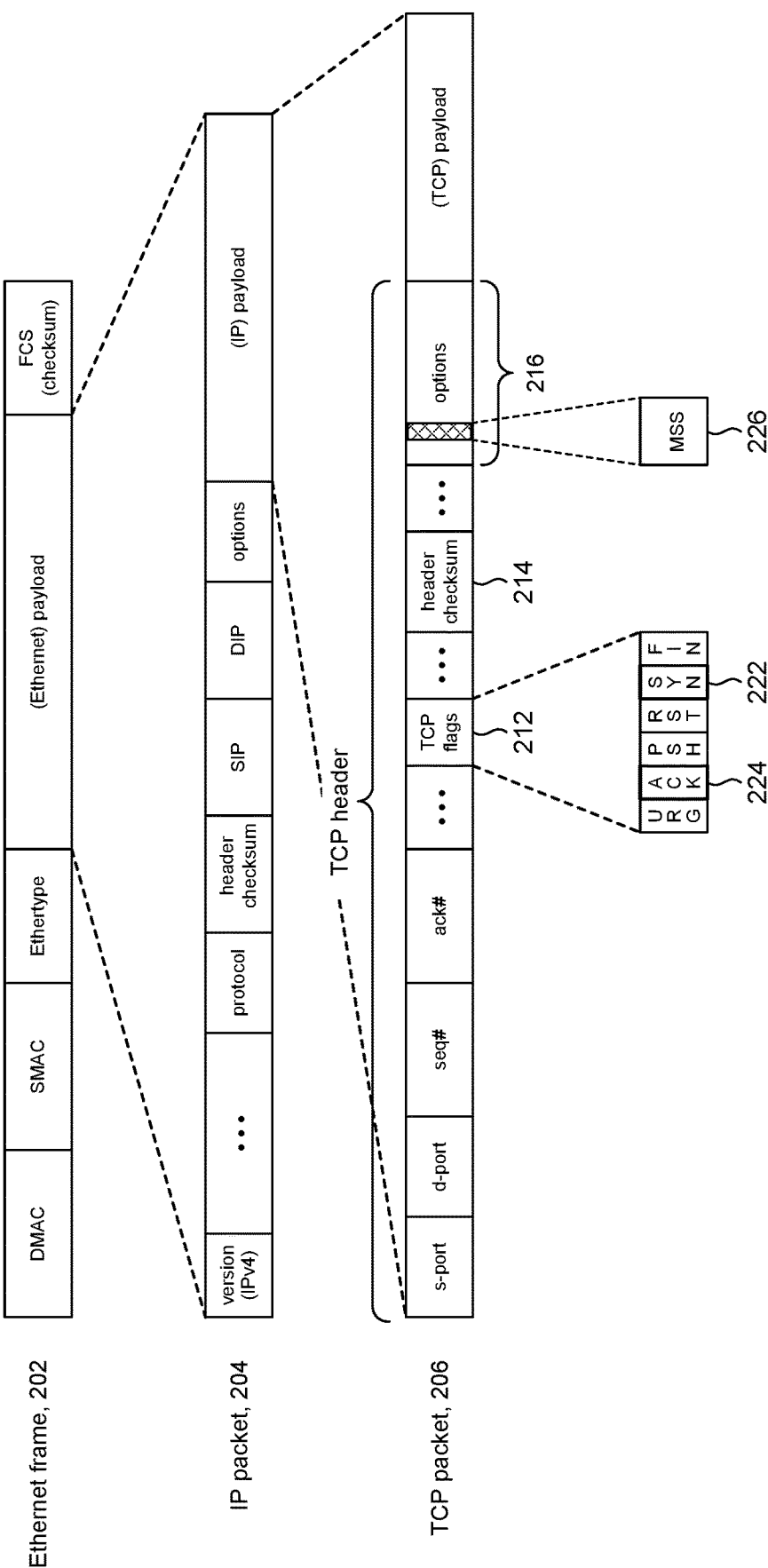
FIG. 2 is a simplified representation of an encapsulated TCP packet.

FIG. 2 shows the format of a TCP packet in the larger context of an Ethernet frame. In some embodiments, when a host (e.g., Host A) transmits a TCP packet 206 to another host (e.g., Host B), the packet can be encapsulated (contained) in an IP packet 204, which in turn can be encapsulated in an Ethernet frame 202. FIG. 2 illustrates this encapsulation hierarchy. The version of IP packet 204 in FIG. 2 is IPv4, although it will be appreciated that the IP packet can be version IPv6.

TCP packet 206 contains various data fields, including a TCP flags data field 212, a checksum data field 214, and an options data field 216 that can contain zero or more options. These data fields are components of the TCP header portion of TCP packet 206. Checksum data field 214 contains a checksum value that is typically computed based on a pseudo IP header (comprising the source IP and destination IP addresses, IP protocol, and TCP length) the TCP header and the TCP payload. Options data field 216 can include an MSS data field 226 that contains the TCP MSS value described above.

TCP flags data field 212 includes two bits, SYN bit 222 and ACK bit 224, that are used in the 3-way handshake depicted above in FIG. 1. In some embodiments, for example, SYN packet 104 is an Ethernet frame that contains a TCP packet whose SYN bit 222 is set to '1' and ACK bit 224 is set to '0'. Similarly, SYN/ACK packet 106 is an Ethernet frame that contains a TCP packet whose SYN bit 222 is set to '1' and ACK bit 224 is set to '1'.

Figure 3:
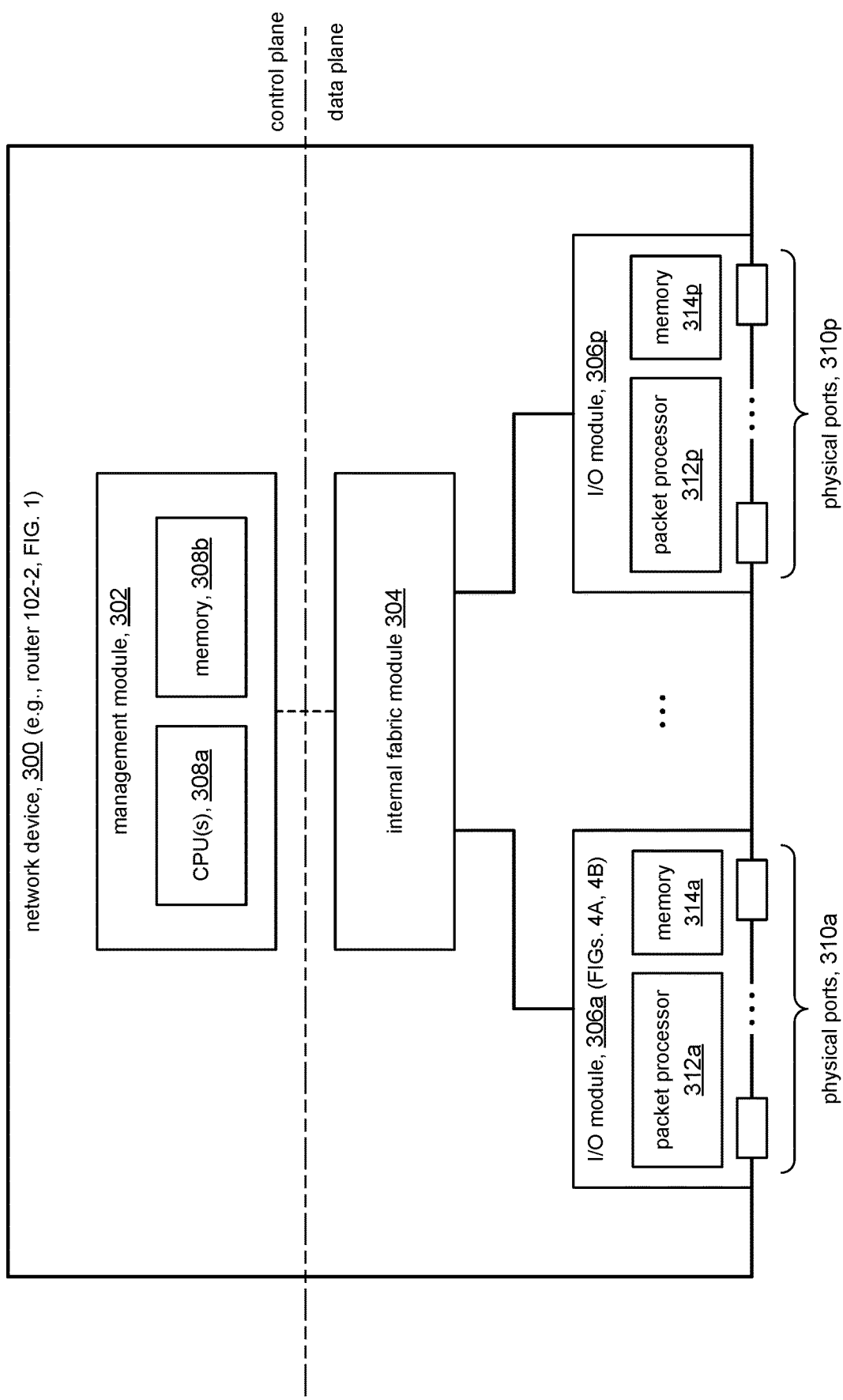
FIG. 3 is a high level block diagram of a network device.

FIG. 3 depicts an example of a network device 300 (e.g. router 102-2, FIG. 1) in accordance with some embodiments of the present disclosure. As shown, network device 300 can include a management module 302, an internal fabric module 304, and one or more I/O modules 306a-306p. Management module 302 constitutes the control plane (also referred to as the control layer) of network device 300 and can include one or more management CPUs 308a for managing and controlling operation of network device 300. Each management CPU 308a can be a general purpose processor, such as but not limited to an Intel®/AMD® x86 or ARM® processor, that operates under the control of software stored in a memory 308b, such as dynamic random access memory (DRAM).

Internal fabric module 304 and I/O modules 306a-306p collectively represent the data plane of network device 300 (also referred to as data layer, forwarding plane, etc.). Internal fabric module 304 serves to interconnect the various other modules of network device 300. Each I/O module 306a-306p includes one or more physical ports 310a-310p that are used by network device 300 to send and receive network packets. Each I/O module 306a-306p can include packet processing capability, logically represented by respective packet processors 312a-312p and memory components 314a-314p. Each packet processor 312a-312p can comprise a forwarding hardware component, comprising for example, elements such as application specific integrated circuit (ASIC), field programmable array (FPGA), digital processing unit, content-addressable memory, and the like. The forwarding hardware component can be configured to make wire speed decisions on how to handle incoming (ingress) and outgoing (egress) network packets. In accordance with some embodiments, some aspects of the present disclosure can be performed wholly within the data plane. In accordance with the present disclosure, the memory components can hold information for processing in accordance with the present disclosure.

Figure 4A:
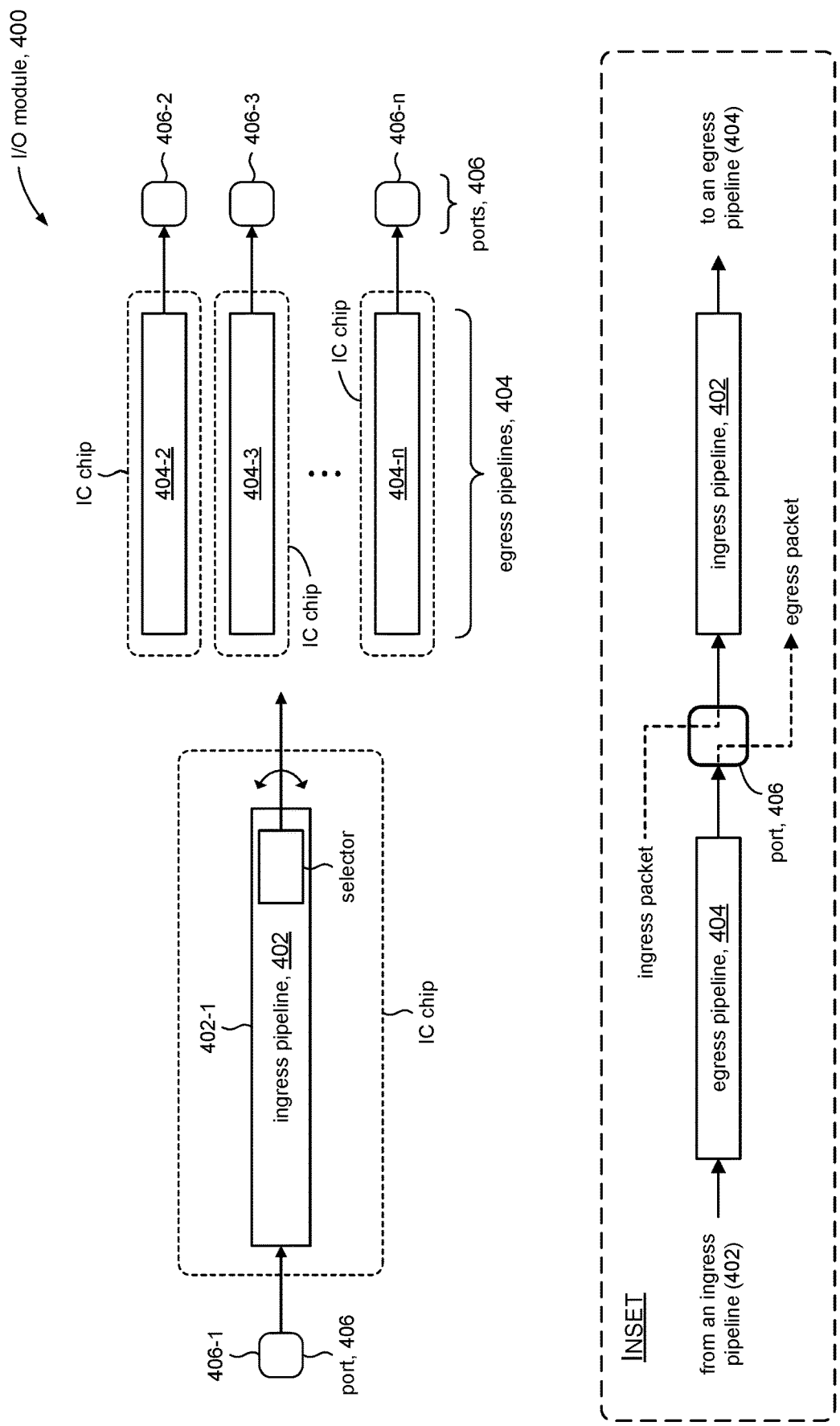
FIGS. 4A and 4B are block diagram representations of ingress pipelines and egress pipelines to process packets in accordance with some embodiments.

FIG. 4A shows a high level representation of an I/O module 400, in accordance with some embodiments, comprising N physical ports 406. The general representation depicted in the inset in FIG. 4A shows that each physical port 406 has a corresponding ingress pipeline 402 to process packets received on that port and a corresponding egress pipeline 404 to process packets to be transmitted on that port. The ingress pipeline 402 forwards the packet to an egress pipeline corresponding to a port on which the packet will egress the switch. The egress pipeline 404 receives a packet from an ingress pipeline corresponding to a port on which the packet ingressed the switch. The additional detail in FIG. 4A, shows that a packet that ingresses on a given port (e.g., port 406-1) is processed by the ingress pipeline (e.g., 402-1) associated with that port to produce an intermediate packet and metadata. The ingress pipeline forwards the resulting intermediate packet and metadata to an egress pipeline (e.g., 404-2) associated with an egress port (e.g., 406-2) on which to transmit an egress packet.

Each ingress pipeline includes selection circuitry (selector) to direct the intermediate packet and associated metadata produced in the ingress pipeline to an appropriate egress pipeline. The example in FIG. 4A shows port 406-1 and its associated ingress pipeline 402-1. The selector in ingress pipeline 402-1 can select an egress pipeline based on information contained in the received packet.

In some embodiments, the network device can be based on a scalable architecture comprising multiple interconnected network chips where the packet processing functionality is distributed between separate ingress and egress pipelines. The ingress pipeline and the egress pipeline can be implemented using separate logic circuitry. In some embodiments, the ingress pipeline and the egress pipeline can be implemented on separate IC (integrated circuit) chips. As FIG. 4A shows for example, in some embodiments, ingress pipelines and egress pipelines can be implemented in separate respective IC chips (network chips). Because the ingress and egress pipelines can be on separate network chips, packets that ingress the switch on one network chip can egress on a completely different chip.

Figure 4B:
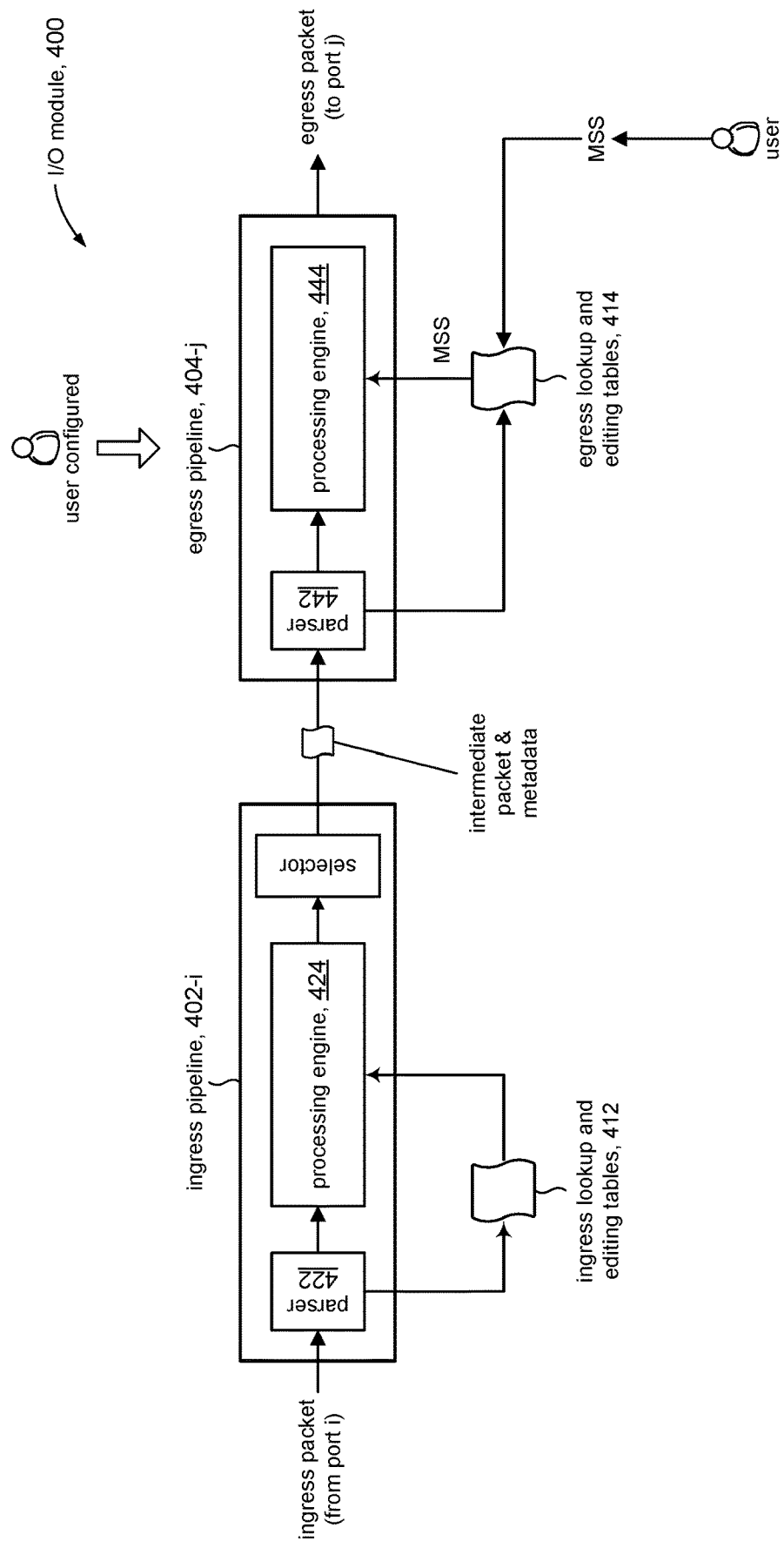

FIG. 4B shows additional details of ingress and egress pipelines in accordance with some embodiments. The example in FIG. 4B shows ingress pipeline 402-*i* to process packets that ingress on port i, and egress pipeline 404-*j* to process packets that egress on port j.

Ingress pipeline 402-*i* can include a parser 422 and a processing engine 424. The ingress pipeline can use ingress lookup and editing tables (ingress data tables) 412 to provide editing instructions based on the contents of the ingress packet to drive processing engine 424. Generally, when a packet is received (ingresses) on a port of the network device, the ingress packet feeds into the ingress pipeline associated with that port. Parser 422 parses the ingress packet to access parts of the packet. The parsed information can be used as search/lookup keys into ingress data tables 412 to produce metadata that can be used to identify an egress pipeline and to direct processing in the egress pipeline; e.g., bridge or route the packet, add a tunnel header or not, etc. In some instances, lookups can be performed using ingress data tables 412 to obtain editing instructions that feed into processing engine 424 to direct editing actions on the ingress packet. In other instances the ingress packet is not edited. In either case, for discussion purposes, the packet coming out of the ingress pipeline can be referred to as an intermediate packet.

The intermediate packet and metadata from ingress pipeline 402-*i* can be forwarded by its associated selector and queued toward an appropriate egress pipeline; e.g., egress pipeline 404-*j* in the example in FIG. 4B. In some embodiments, the selector can select the egress pipeline based on information contained in the metadata and/or the ingress packet.

Egress pipeline 404-*j* can include a parser 442 and a processing engine 444. The egress pipeline can access egress lookup and editing tables (egress data tables) 414 to provide editing instructions to processing engine 444. Generally, when the selector transmits the intermediate packet from the ingress pipeline to the egress pipeline, parser 442 in the egress pipeline can parse the received intermediate packet to access parts of the packet. Various lookups can be performed on the egress data tables 414 using the parsed packet and the metadata to obtain appropriate editing instructions that feed into processing engine 444. The editing instructions can direct actions performed by the processing engine to produce an egress packet.

In some embodiments, the egress data tables can include a TCP MSS clamp value (provided by a user, for example) to facilitate TCP MSS clamping in accordance with the present disclosure. In some embodiments, the user can provide a first TCP MSS clamp value for IPv4 packets and a second TCP MSS clamp value for IPv6 packets. These aspects of the present disclosure are discussed in more detail below.

In some embodiments, egress pipeline 404-*j* can be based on a programmable hardware packet engine such as a system-on-a-chip (SoC) platform, although it will be understood that any suitable programmable hardware can be used. As illustrated in FIG. 4B, components of the egress pipeline (e.g., the parser and processing engine) can be programmed or otherwise configured by a user to operate in accordance with the present disclosure. Some hardware embodiments provide a C++ like application programming interface (API) to allow developers to program or otherwise configure the behavior and functionality of the egress pipeline to operate in accordance with the present disclosure.

Figure 5:
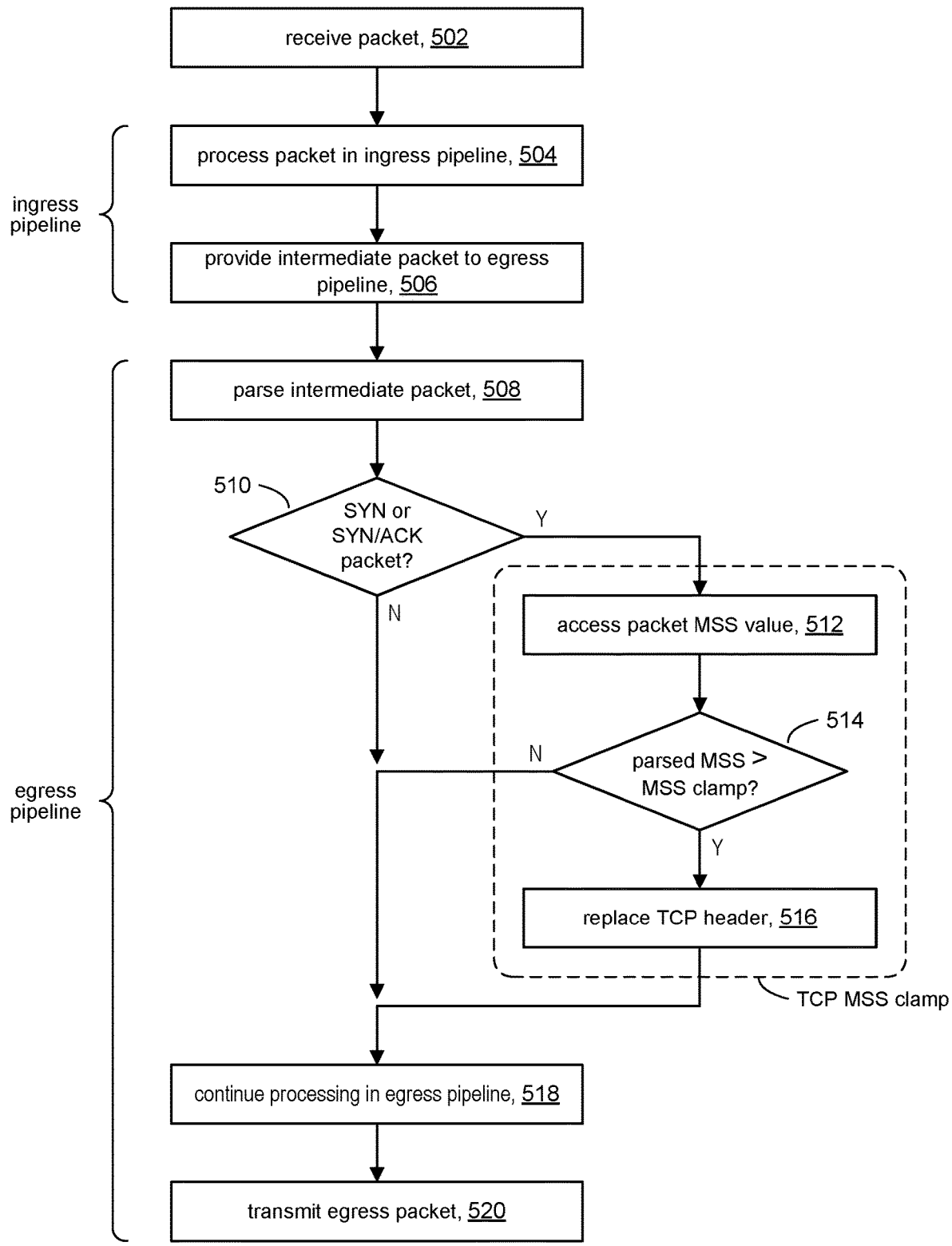
FIG. 5 is a flow of packet processing operations in accordance with some embodiments.

Referring to FIG. 5, the discussion will now turn to a high-level description of processing in a network device (e.g., router 102-2, FIG. 1) for receiving and processing configuration information in accordance with the present disclosure. In some embodiments, for example, the network device can include one or more digital processing units, which when operated, can cause the network device to perform processing in accordance with FIG. 5. Digital processing units can include specialized processors in the data plane such as digital signal processors, field programmable arrays, application specific integrated circuits, and the like that operate by way of executing computer program code or by way of logic circuits being configured for specific operations. In accordance with the present disclosure, for example, I/O modules 306*a*-306*p* (FIG. 3) can be based on a programmable hardware platform that is programmed or otherwise configured to operate in accordance with FIG. 5. The flow of operations performed by the network device is not necessarily limited to the order of operations shown.

At operation 502, the network device can receive a packet on a (ingress) port of the network device. Referring to FIG. 1 for example, the network device (e.g., router 102-2) can receive a packet from an upstream device.

At operation 504, the network device can process the received (ingress) packet in the ingress pipeline associated with the ingress port on which the packet was received. The ingress pipeline may edit the received packet and produce associated metadata, based on information contained in the received packet. The metadata, for example, can include the egress port determined based on addressing information contained in the received packet. In some embodiments, the received packet can be an Ethernet frame (e.g., FIG. 2), and the addressing information used to identify the egress port can be the destination media access control (DMAC) address contained in the Ethernet frame.

At operation 506, the ingress pipeline can provide the intermediate packet and metadata to the egress pipeline associated with the egress port. Processing of the intermediate packet and metadata continues in the egress pipeline.

At operation 508, the egress pipeline can parse the intermediate packet. In some embodiments for example, the parser component (e.g., 442, FIG. 4B) can be programmed or otherwise configured to parse the intermediate packet in accordance with the present disclosure. More specifically and with reference to FIG. 2 as an example, the parser in the egress pipeline can be programmed or otherwise configured to parse the Ethernet frame 202 to access the IP packet 204 in the Ethernet payload. The IP packet can in turn be parsed to access the TCP packet 206 in the IP payload. The parser can then parse the TCP header to access the TCP flags and in particular to access SYN bit 222 and ACK bit 224.

At decision point 510, if the intermediate packet is a SYN or SYN/ACK packet, then processing can continue to operation 512. If the intermediate packet is neither a SYN packet nor a SYN/ACK packet, then processing can continue to 518. As noted above, in some embodiments, a SYN packet is a packet whose SYN bit is set ('1') and whose ACK bit is reset or cleared ('0'). A SYN/ACK packet is a packet whose SYN bit is set ('1') and whose ACK bit is also set ('1'). Accordingly, the parser can be programmed or otherwise configured to use the parsed SYN and ACK bits to determine if the intermediate packet is a SYN packet or a SYN/ACK packet.

At operation 512, the egress pipeline can be programmed or otherwise configured to continue parsing the TCP header to parse the MSS parameter 226 (FIG. 2) contained in the options data field 216. Each option in the options data field is identified by an "option kind" designator (e.g., the MSS parameter has an option kind of '2') that the parser parses to identify MSS parameter 226. In some instances, the MSS parameter can be the first option in the options data field. In other instances, the MSS parameter can be located elsewhere in the options data field.

At decision point 514, if the value of the parsed MSS parameter is greater than an MSS clamp (replacement) value, then processing can continue to operation 516. If the parsed MSS value is not greater than the MSS clamp value, then the original value of the MSS parameter can be retained (remains unchanged) and processing can continue to operation 518. As noted above, in some embodiments the MSS clamp value can be a user provided value that is stored in one of the egress data tables (e.g., 414, FIG. 4B). The egress pipeline can be programmed or otherwise configured to access the MSS clamp value from the egress data tables and compare the accessed value against the MSS value parsed out of the TCP header.

In some embodiments, the MSS clamp value can be based on the IP address version, namely whether the IP address is IPv4 or IPv6. As noted above, in some embodiments the user can provide an MSS clamp value for IPv4 and another MSS clamp value for IPv6, to accommodate for different segment sizes between IPv4 and IPv6 packets. Accordingly, in some embodiments, the ingress pipeline can parse the received packet to identify the version of the packet's IP address (IPv4, IPv6) and store the parsed information in the metadata that is provided to the egress pipeline. In other embodiments, the IP version can be determined by the parser in the egress pipeline. The processing engine in the egress pipeline (e.g., 444, FIG. 4B) can be programmed or otherwise configured to access the MSS clamp value (e.g., from its egress data tables) that corresponds to the packet version.

At operation 516, the processing engine can be programmed or otherwise configured to replace the TCP header in response to the parsed MSS value being greater than the MSS clamp value. In some embodiments, for example, the processing engine in the egress pipeline can be programmed or otherwise configured to generate a new TCP header from the (old) TCP header in the intermediate packet. Referring to FIG. 2, for example, all the data in the old TCP header can be copied into a new TCP header, except for the MSS data field 226 and the header checksum data field 214. The parsing engine can write the appropriate MSS clamp value (e.g., for IPv4 or ipv6) into the MSS data field 226 of the new TCP header. The processing engine can be programmed or otherwise configured to compute a new TCP checksum value to account for the replaced MSS value and write the new TCP checksum value to the TCP checksum data field 214. The processing engine can then overwrite or otherwise replace the old TCP header in the intermediate packet with the new TCP header.

As noted above, because the egress pipeline can be implemented in programmable hardware, operations 512-516 can be referred to as a hardware TCP MSS clamp. Notably, the clamping is performed in the data plane of the network device. The control plane does not participate in clamping the TCP MSS. Latency due to clamping can be minimized because the clamping operations occur entirely in the data plane (e.g., in the egress pipeline) without any participation from the control plane or contribution from the control plane.

At operation 518, the egress pipeline can continue processing the intermediate packet to produce an egress packet. If the packet is a SYN or SYN/ACK packet, then the packet will be subject to the TCP clamp hardware where TCP MSS clamping may or may not be performed per the outcome of decision point 514.

At operation 520, the egress pipeline can transmit the egress packet on the associated (egress) port. It is noted that in some instances the ingress port and the egress port can be different ports, and in other instances the ingress port and the egress port can be the same port. Processing of the received packet by the network device can be deemed complete.

FURTHER EXAMPLES

In accordance with the present disclosure, a method in a network device for modifying a transmission control protocol (TCP) header includes receiving a packet; performing first processing of the received packet in an ingress pipeline; and performing second processing of the received packet in an egress pipeline separate from the ingress pipeline, including the egress pipeline. The second processing in the egress pipeline includes detecting a TCP maximum segment size (MSS) data field in a TCP header of the received packet; in response to detecting the TCP MSS data field, comparing a value in the TCP MSS data field with a replacement value; and in response to the value in the TCP MSS data field exceeding the replacement value. Modifying the TCP header includes replacing the value in the TCP MSS data field with the replacement value; and transmitting an egress packet comprising a TCP MSS data field containing the replacement value.

In some embodiments, the method further includes receiving the packet on a first port of the network device, wherein the ingress pipeline is associated with the first port; and transmitting the egress packet on a second port of the network device different from the first port, wherein the egress pipeline is associated with the second port.

In some embodiments, the replacement value is a first value when the received packet is an IPv4 packet, wherein the replacement value is a second value when the received packet is an IPv6 packet.

In some embodiments, the method further includes replacing a checksum value in the TCP header of the received packet with a recomputed checksum value to reflect that the value in the TCP MSS data field has been replaced with the replacement value.

In some embodiments, the received packet is a packet in a sequence of packets for setting up a TCP session between two endpoint devices. In some embodiments, the received packet is a SYN packet or a SYN-ACK packet.

In some embodiments, the TCP MSS data field is the first data field in an options data field in the TCP header of the received packet.

In accordance with the present disclosure, a network device includes a plurality of ports for receiving packets and transmitting packets; a first port among the plurality of ports associated with an ingress pipeline to process a packet received on the first port; and a second port among the plurality of ports associated with an egress pipeline, separate from the ingress pipeline, to process a packet for transmission on the second port, the egress pipeline configured to process a packet received from the ingress pipeline, including replacing a TCP MSS value in the received packet with a replacement TCP MSS value when the TCP MSS value is greater than the replacement TCP MSS value.

In some embodiments, the egress pipeline is further configured to replace a TCP header checksum value in the packet received from the ingress pipeline with a recomputed checksum value when the TCP MSS value in the received packet is replaced with the replacement TCP MSS value.

In some embodiments, the packet received from the ingress pipeline is a SYN packet or a SYN/ACK packet.

In some embodiments, the network device further includes an egress data table associated with the egress pipeline, the egress data table having stored therein a first value and a second value, wherein the egress pipeline is configured to replace the TCP MSS value in the received packet with the first value when the packet is an IPv4 packet and the TCP MSS value is greater than the first value, wherein the egress pipeline is further configured to replace the TCP MSS value with the second value when the packet is an IPv6 packet and the TCP MSS value is greater than the second value.

In some embodiments, the ingress pipeline is in a first network chip in the network device and the egress pipeline is in a second network chip in the network device.

In some embodiments, the egress pipeline is a programmable hardware component and is programmed: (i) to detect when the packet received from the ingress pipeline is a first kind of packet or a second kind of packet and in response thereto (ii) to detect when the TCP MSS value in the received packet is greater than the replacement TCP MSS value and in response thereto (iii) to replace the TCP MSS value in the received packet with the replacement TCP MSS value.

In some embodiments, the first port and the second are the same port.

In accordance with the present disclosure, a method in a network device includes receiving a packet; performing first processing of the received packet in an ingress pipeline; and performing second processing of the received packet in an egress pipeline separate from the ingress pipeline, including the egress pipeline replacing an original TCP MSS value in the received packet with a replacement TCP MSS value when the original TCP MSS value is greater than the replacement TCP MSS value; and retaining the original TCP MSS value when the original TCP MSS value is not greater than the replacement TCP MSS value.

In some embodiments, the method further includes the egress pipeline: determining that the received packet is a SYN packet or a SYN/ACK packet and in response thereto comparing the original TCP MSS value with the replacement TCP MSS value; and replacing the original TCP MSS value with the replacement TCP MSS value in response to determining that the original TCP MSS value is greater than the replacement TCP MSS value. In some embodiments, the received packet is a packet in a sequence of packets for setting up a TCP session between two endpoint devices.

In some embodiments, the replacement value is a first value when the received packet is an IPv4 packet, wherein the replacement value is a second value when the received packet is an IPv6 packet.

In some embodiments, the method further includes replacing a checksum value in a TCP header of the received packet with a recomputed checksum value when the original TCP MSS value has been replaced with the replacement TCP MSS value.

In some embodiments, the TCP MSS value is the first data field in an options data field in a TCP header of the received packet.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a network device for modifying a transmission control protocol (TCP) header, the method comprising:
    receiving a packet;
    performing first processing of the received packet in an ingress pipeline; and
    performing second processing of the received packet in an egress pipeline separate from the ingress pipeline, including the egress pipeline:
        detecting a TCP maximum segment size (MSS) data field in a TCP header of the received packet;
        accessing an editing table to obtain editing instructions and a replacement value, the editing instructions to cause the egress pipeline to edit the received packet to produce an egress packet;
        in response to detecting the TCP MSS data field, comparing a value in the TCP MSS data field of the received packet with a replacement value; and
        in response to the value in the TCP MSS data field exceeding the replacement value, replacing the value in the TCP MSS data field with the replacement value;
        processing the received packet in accordance with the editing instructions to produce an egress packet; and
        transmitting the egress packet comprising the TCP MSS data field containing the replacement value.

2. The method of claim 1, further comprising receiving the packet on a first port of the network device, wherein the ingress pipeline is associated with the first port; and transmitting the egress packet on a second port of the network device different from the first port, wherein the egress pipeline is associated with the second port.

3. The method of claim 1, wherein the replacement value is a first value when the received packet is an IPv4 packet, wherein the replacement value is a second value when the received packet is an IPv6 packet.

4. The method of claim 1, further comprising replacing a checksum value in the TCP header of the received packet with a recomputed checksum value to reflect that the value in the TCP MSS data field has been replaced with the replacement value.

5. The method of claim 1, wherein the received packet is a packet in a sequence of packets for setting up a TCP session between two endpoint devices.

6. The method of claim 5, wherein the received packet is a SYN packet or a SYN-ACK packet.

7. The method of claim 1, wherein the TCP MSS data field is the first data field in an options data field in the TCP header of the received packet.

8. A network device comprising:
    a plurality of ports for receiving packets and transmitting packets;
    a first port among the plurality of ports associated with an ingress pipeline to process a packet received on the first port; and
    a second port among the plurality of ports associated with an egress pipeline, separate from the ingress pipeline, to process a packet for transmission on the second port, the egress pipeline configured to process a packet received from the ingress pipeline, including:
        accessing an editing table to obtain editing instructions and a replacement TCP MSS value;

processing the received packet in accordance with the editing instructions to produce an egress packet;

replacing a TCP MSS value in the egress packet with the replacement TCP MSS value when the TCP MSS value is greater than the replacement TCP MSS value; and transmitting the egress packet comprising the replacement TCP MSS value.

9. The network device of claim 8, wherein the egress pipeline is further configured to replace a TCP header checksum value in the packet received from the ingress pipeline with a recomputed checksum value when the TCP MSS value in the received packet is replaced with the replacement TCP MSS value.

10. The network device of claim 8, wherein the packet received from the ingress pipeline is a SYN packet or a SYN/ACK packet.

11. The network device of claim 8, further comprising an egress data table associated with the egress pipeline, the egress data table having stored therein a first value and a second value, wherein the egress pipeline is configured to replace the TCP MSS value in the received packet with the first value when the packet is an IPv4 packet and the TCP MSS value is greater than the first value, wherein the egress pipeline is further configured to replace the TCP MSS value with the second value when the packet is an IPv6 packet and the TCP MSS value is greater than the second value.

12. The network device of claim 8, wherein the ingress pipeline is in a first network chip in the network device and the egress pipeline is in a second network chip in the network device.

13. The network device of claim 8, wherein the egress pipeline is a programmable hardware component and is programmed: (i) to detect when the packet received from the ingress pipeline is a first kind of packet or a second kind of packet and in response thereto (ii) to detect when the TCP MSS value in the received packet is greater than the replacement TCP MSS value and in response thereto (iii) to replace the TCP MSS value in the received packet with the replacement TCP MSS value.

14. The network device of claim 13, wherein the first port and the second are the same port.

15. A method in a network device, the method comprising:

receiving a packet;

performing first processing of the received packet in an ingress pipeline; and performing second processing of the received packet in an egress pipeline separate from the ingress pipeline, including the egress pipeline:

accessing an editing table to obtain editing instructions and a replacement TCP MSS value;

replacing an original TCP MSS value in the received packet with the replacement TCP MSS value when the original TCP MSS value is greater than the replacement TCP MSS value;

retaining the original TCP MSS value when the original TCP MSS value is not greater than the replacement TCP MSS value;

processing the received packet in accordance with the editing instructions to produce an egress packet; and transmitting the egress packet comprising the replacement TCP MSS value.

16. The method of claim 15, further comprising the egress pipeline: determining that the received packet is a SYN packet or a SYN/ACK packet and in response thereto comparing the original TCP MSS value with the replacement TCP MSS value; and replacing the original TCP MSS value with the replacement TCP MSS value in response to determining that the original TCP MSS value is greater than the replacement TCP MSS value.

17. The method of claim 16, wherein the received packet is a packet in a sequence of packets for setting up a TCP session between two endpoint devices.

18. The method of claim 15, wherein the replacement value is a first value when the received packet is an IPv4 packet, wherein the replacement value is a second value when the received packet is an IPv6 packet.

19. The method of claim 15, further comprising replacing a checksum value in a TCP header of the received packet with a recomputed checksum value when the original TCP MSS value has been replaced with the replacement TCP MSS value.

20. The method of claim 15, wherein the TCP MSS value is the first data field in an options data field in a TCP header of the received packet.

* * * * *